(12) United States Patent
Pan et al.

(10) Patent No.: US 11,915,889 B2
(45) Date of Patent: Feb. 27, 2024

(54) CONTROL DEVICE

(71) Applicant: Primax Electronics Ltd., Taipei (TW)

(72) Inventors: Yung-Tai Pan, Taipei (TW); Chun-Nan Su, Taipei (TW); Chien-Pang Chien, Taipei (TW); Ting-Sheng Wang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 60 days.

(21) Appl. No.: 17/840,601

(22) Filed: Jun. 14, 2022

(65) Prior Publication Data
US 2023/0223214 A1 Jul. 13, 2023

Related U.S. Application Data

(60) Provisional application No. 63/298,947, filed on Jan. 12, 2022.

(51) Int. Cl.
| | |
|---|---|
| *H01H 13/705* | (2006.01) |
| *G06F 3/02* | (2006.01) |
| *H01H 13/83* | (2006.01) |
| *H01H 13/14* | (2006.01) |

(52) U.S. Cl.
CPC ......... *H01H 13/705* (2013.01); *G06F 3/0202* (2013.01); *H01H 13/14* (2013.01); *H01H 13/83* (2013.01)

(58) Field of Classification Search
CPC ...... G06F 33/00; G06F 33/02; G06F 33/0202; G06F 33/0219; G06F 33/0227; G06F 33/0317; G06F 33/041; G06F 33/0412; G06F 33/042; G06F 33/048; G06F 33/044; G06F 33/0441; G06F 33/0442; G06F 33/0445; G06F 33/0489; H01H 2003/12; H01H 2009/00; H01H 2009/16; H01H 2009/164; H01H 2009/161; H01H 2013/00; H01H 2013/50; H01H 2013/52; H01H 13/00; H01H 13/12; H01H 13/14; H01H 13/50; H01H 13/7006; H01H 13/702; H01H 13/704; H01H 13/70; H01H 13/705; H01H 13/83; H01H 13/85; H01H 9/00; H01H 9/16; H01H 9/18; H01H 9/182
See application file for complete search history.

(56) References Cited

U.S. PATENT DOCUMENTS

| | | | | |
|---|---|---|---|---|
| 2006/0007645 | A1* | 1/2006 | Chen | G06F 3/0202 |
| | | | | 361/679.04 |
| 2009/0128496 | A1* | 5/2009 | Huang | G06F 3/0202 |
| | | | | 345/170 |
| 2011/0272262 | A1* | 11/2011 | Chen | H01H 13/83 |
| | | | | 200/310 |

* cited by examiner

*Primary Examiner* — Anthony R Jimenez
(74) *Attorney, Agent, or Firm* — KIRTON McCONKIE; Evan R. Witt (57) ABSTRACT

A control device is provided. A key structure of the control device includes a keycap, an optical film layer and a membrane switch. A protrusion structure is formed on the optical film layer or the membrane switch. When the keycap is pressed down by the user, the arrangement of the protrusion structure can facilitate the user to trigger the underlying membrane switch more precisely.

23 Claims, 11 Drawing Sheets

CONTROL DEVICE

CROSS-REFERENCE TO RELATED APPLICATION

This application claims priority to U.S. Provisional Patent Application No. 63/298,947 filed Jan. 12, 2022, the contents of which are incorporated herein by reference.

FIELD OF THE INVENTION

The present invention relates to a control device, and more particularly to a control device with a display panel and at least one light-transmissible key structure.

BACKGROUND OF THE INVENTION

A control device is widely used in a live streaming machine, a live production switcher, an ordering machine or a drawing device. The control device comprises a display panel and plural light-transmissible key structures. Due to the cooperation of the display panel and the light-transmissible key structures, the control device has the visualized buttons for facilitating the user to select desired items and perform associated operations in an intuitive manner.

For achieving the above purposes, the key structure of the conventional control device needs to have a hollow portion. Due to the hollow portion of the key structure, it is difficult to effectively and precisely trigger the membrane switch. In other words, the key structure of the conventional control device needs to have a special structural design so as to overcome the above drawbacks.

SUMMARY OF THE INVENTION

In order to overcome the drawbacks of the conventional technologies, the present invention provides a control device. The key structure of the control device comprises a keycap, an optical film layer and a membrane switch. A protrusion structure is formed on the optical film layer or the membrane switch. When the keycap is pressed down by the user, the arrangement of the protrusion structure can facilitate the user to trigger the underlying membrane switch more precisely. Moreover, the technology of the present invention can meet the specification requirements of different products. By adjusting or controlling the height of the protrusion structure, the travel distance and the tactile feel of pressing down the key structure are changed. Consequently, the fabricating cost is reduced, and the time period of modifying or verifying molds is reduced.

In accordance with an aspect of the present invention, a control device is provided. The control device includes a display panel and at least one key structure. The at least one key structure is located over the display panel. Each key structure includes a keycap, an optical film layer, an elastic element, a first protrusion structure and a membrane switch. The keycap is light-transmissible. The elastic element is arranged between the keycap and the optical film layer. The elastic element includes a support part, a lateral wall and a lower part. The support part is connected with the keycap. The lateral wall is arranged between the support part and the lower part. The first protrusion structure is formed on the optical film layer. The membrane switch is located under the optical film layer. When the keycap is pressed down, the keycap or the support part is moved downwardly to push the first protrusion structure. Consequently, the membrane switch is triggered.

In an embodiment, the membrane switch includes an upper film layer and a lower film layer. The upper film layer includes a first top surface, at least one first opening, a first bottom surface and a first circuit contact point. The lower film layer includes a second top surface, at least one second opening, a second bottom surface and a second circuit contact point. The at least one first opening runs through the first top surface and the first bottom surface. The first bottom surface faces the lower film layer, the first circuit contact point is formed on the first bottom surface. The at least one second plural opening runs through the second top surface and the second bottom surface. The second top surface faces the upper film layer. The second circuit contact point is formed on the second top surface. The first circuit contact point and the second circuit contact point are overlapped with each other along a vertical direction. A light beam emitted by the display panel is transmitted upwardly through the at least one second opening, the at least one first opening and the keycap.

In an embodiment, the membrane switch further includes at least one ink member, and at least one ink member is formed on the first bottom surface or the second top surface. The upper film layer and the lower film layer are separated from each other through the at least one ink member.

In an embodiment, the at least one ink member is formed on the first bottom surface or the second top surface by using a UV printing process.

In an embodiment, the at least one ink member includes a first ink structure and a second ink structure. The first ink structure is formed on the first bottom surface. The second ink structure is formed on the second top surface. The first ink structure and the second ink structure are contacted with each other along the vertical direction.

In an embodiment, the membrane switch further includes a spacer. The spacer is arranged between the upper film layer and the lower film layer. The upper film layer and the lower film layer are separated from each other through the spacer.

In an embodiment, the first protrusion structure is overlapped with the first circuit contact point and the second circuit contact point along the vertical direction.

In an embodiment, when the keycap is pressed down, the keycap or the support part is moved downwardly to push the first protrusion structure, so that the first circuit contact point and the second circuit contact point are contacted with each other.

In an embodiment, the optical film layer is a light-shielding sheet.

In an embodiment, the first protrusion structure is made of rubber, epoxy resin or polyester resin, and the first protrusion structure is formed by using an attaching process, a printing process, a coating process, a glue dispensing process or an integral formation process.

In an embodiment, the keycap includes a press surface, a lateral surface and a bottom surface, and the support part of the elastic element is connected with the lateral surface of the keycap. When the keycap is pressed down, the bottom surface of the keycap is moved downwardly to push the first protrusion structure.

In an embodiment, the keycap includes a press surface, a lateral surface and a bottom surface, and the bottom surface of the keycap is contacted with the support part of the elastic element. When the keycap is pressed down, the support part of the elastic element is moved downwardly to push the first protrusion structure.

In an embodiment, the keycap includes a press surface, a lateral surface, a third bottom surface and a second protrusion structure. The second protrusion structure is protruded downwardly from the third bottom surface. The second protrusion structure is overlapped with the first protrusion structure, the first circuit contact point and the second circuit contact point along the vertical direction. The support part of the elastic element includes a recess, and the second protrusion structure is received within the recess.

In accordance with another aspect of the present invention, a control device is provided. The control device includes a display panel and at least one key structure. The at least one key structure is located over the display panel. Each key structure includes a keycap, a membrane switch, an elastic element and a first protrusion structure. The keycap is light-transmissible. The elastic element is arranged between the keycap and the membrane switch. The elastic element includes a support part, a lateral wall and a lower part. The support part is connected with the keycap. The lateral wall is arranged between the support part and the lower part. The first protrusion structure is formed on the membrane switch. When the keycap is pressed down, the keycap or the support part is moved downwardly to push the first protrusion structure, so that the membrane switch is triggered.

In an embodiment, the membrane switch includes an upper film layer and a lower film layer. The upper film layer includes a first top surface, at least one first opening, a first bottom surface and a first circuit contact point. The lower film layer includes a second top surface, at least one second opening, a second bottom surface and a second circuit contact point. The at least one first opening runs through the first top surface and the first bottom surface. The first bottom surface faces the lower film layer, the first circuit contact point is formed on the first bottom surface. The at least one second plural opening runs through the second top surface and the second bottom surface. The second top surface faces the upper film layer. The second circuit contact point is formed on the second top surface. The first circuit contact point and the second circuit contact point are overlapped with each other along a vertical direction. A light beam emitted by the display panel is transmitted upwardly through the at least one second opening, the at least one first opening and the keycap.

In an embodiment, the membrane switch further includes at least one ink member, and at least one ink member is formed on the first bottom surface or the second top surface. The upper film layer and the lower film layer are separated from each other through the at least one ink member.

In an embodiment, the at least one ink member is formed on the first bottom surface or the second top surface by using a UV printing process.

In an embodiment, the at least one ink member includes a first ink structure and a second ink structure. The first ink structure is formed on the first bottom surface. The second ink structure is formed on the second top surface. The first ink structure and the second ink structure are contacted with each other along the vertical direction.

In an embodiment, the membrane switch further includes a spacer. The spacer is arranged between the upper film layer and the lower film layer. The upper film layer and the lower film layer are separated from each other through the spacer.

In an embodiment, the first protrusion structure is overlapped with the first circuit contact point and the second circuit contact point along the vertical direction.

In an embodiment, when the keycap is pressed down, the keycap or the support part is moved downwardly to push the first protrusion structure, so that the first circuit contact point and the second circuit contact point are contacted with each other.

In an embodiment, the first protrusion structure is made of rubber, epoxy resin or polyester resin, and the first protrusion structure is formed by using an attaching process, a printing process, a coating process, a glue dispensing process or an integral formation process.

In an embodiment, the keycap includes a press surface, a lateral surface and a bottom surface, and the support part of the elastic element is connected with the lateral surface of the keycap. When the keycap is pressed down, the bottom surface of the keycap is moved downwardly to push the first protrusion structure.

In an embodiment, the keycap includes a press surface, a lateral surface and a bottom surface, and the bottom surface of the keycap is contacted with the support part of the elastic element. When the keycap is pressed down, the support part of the elastic element is moved downwardly to push the first protrusion structure.

In an embodiment, the keycap includes a press surface, a lateral surface, a third bottom surface and a second protrusion structure. The second protrusion structure is protruded downwardly from the third bottom surface. The second protrusion structure is overlapped with the first protrusion structure, the first circuit contact point and the second circuit contact point along the vertical direction. The support part of the elastic element includes a recess, and the second protrusion structure is received within the recess.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides a control device. The control device is applied to a live streaming machine, a live production switcher, an ordering machine or a drawing device.

Figure 1:
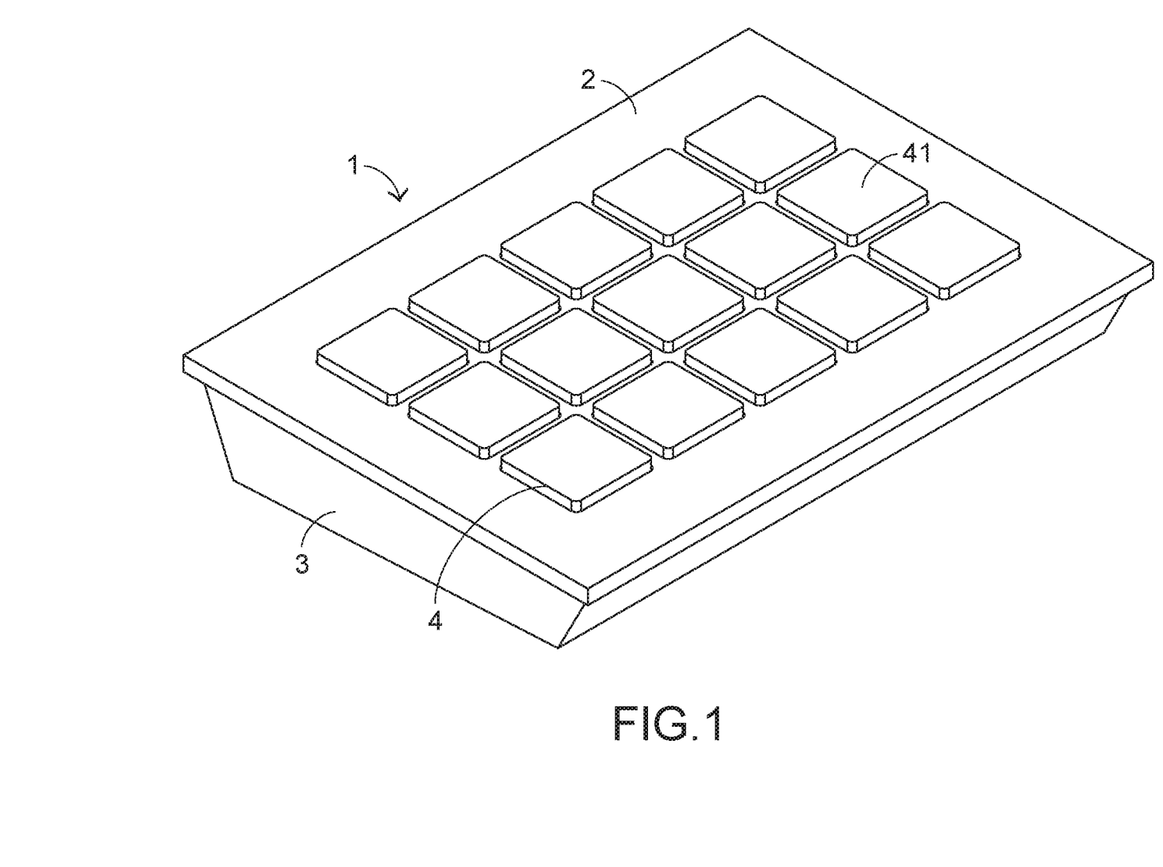
FIG. 1 is a schematic perspective view illustrating the assembled structure of a control device according to a first embodiment of the present invention.
Figure 2:
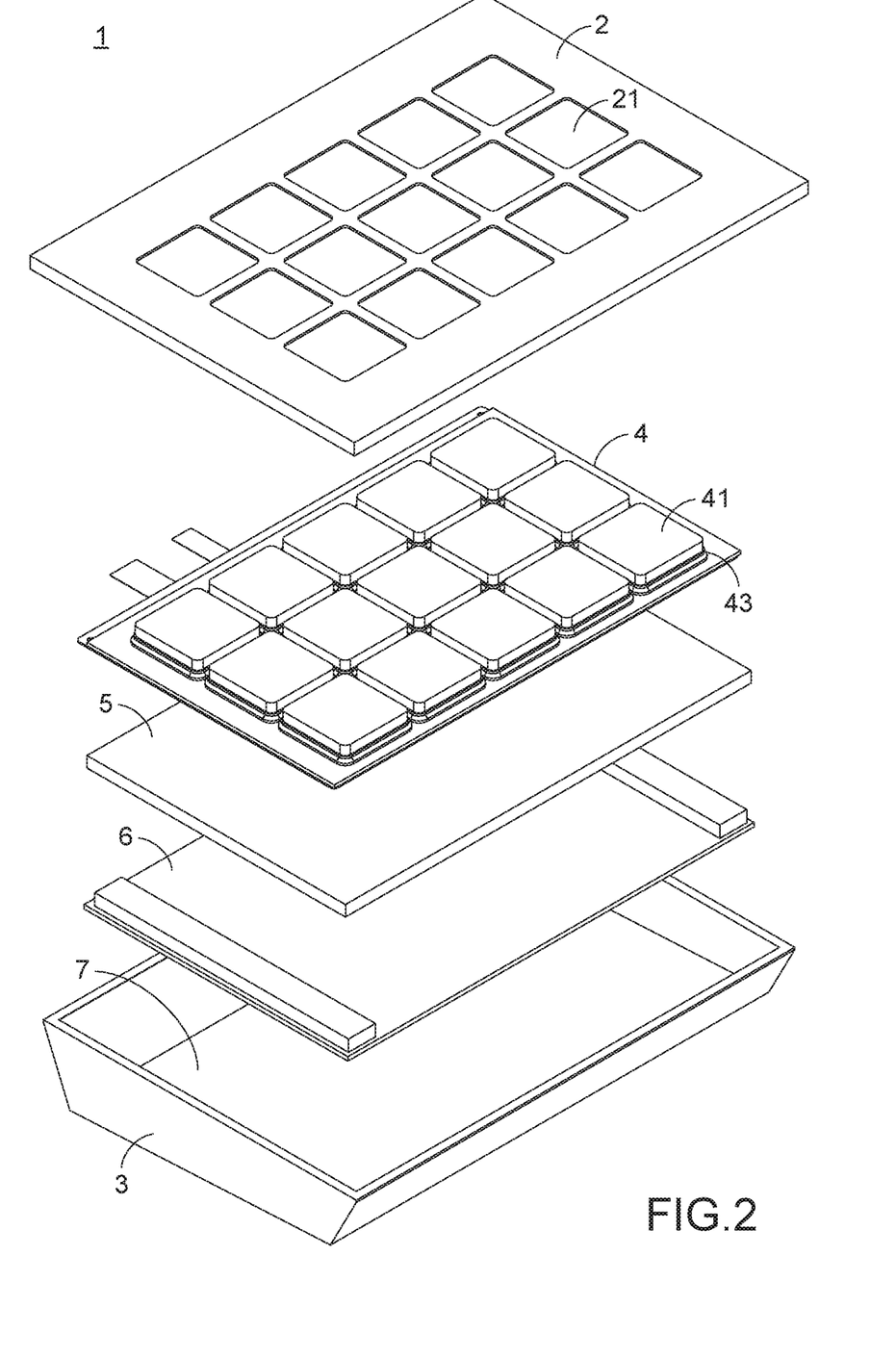
FIG. 2 is a schematic exploded view illustrating the control device as shown in FIG. 1.
Figure 3:
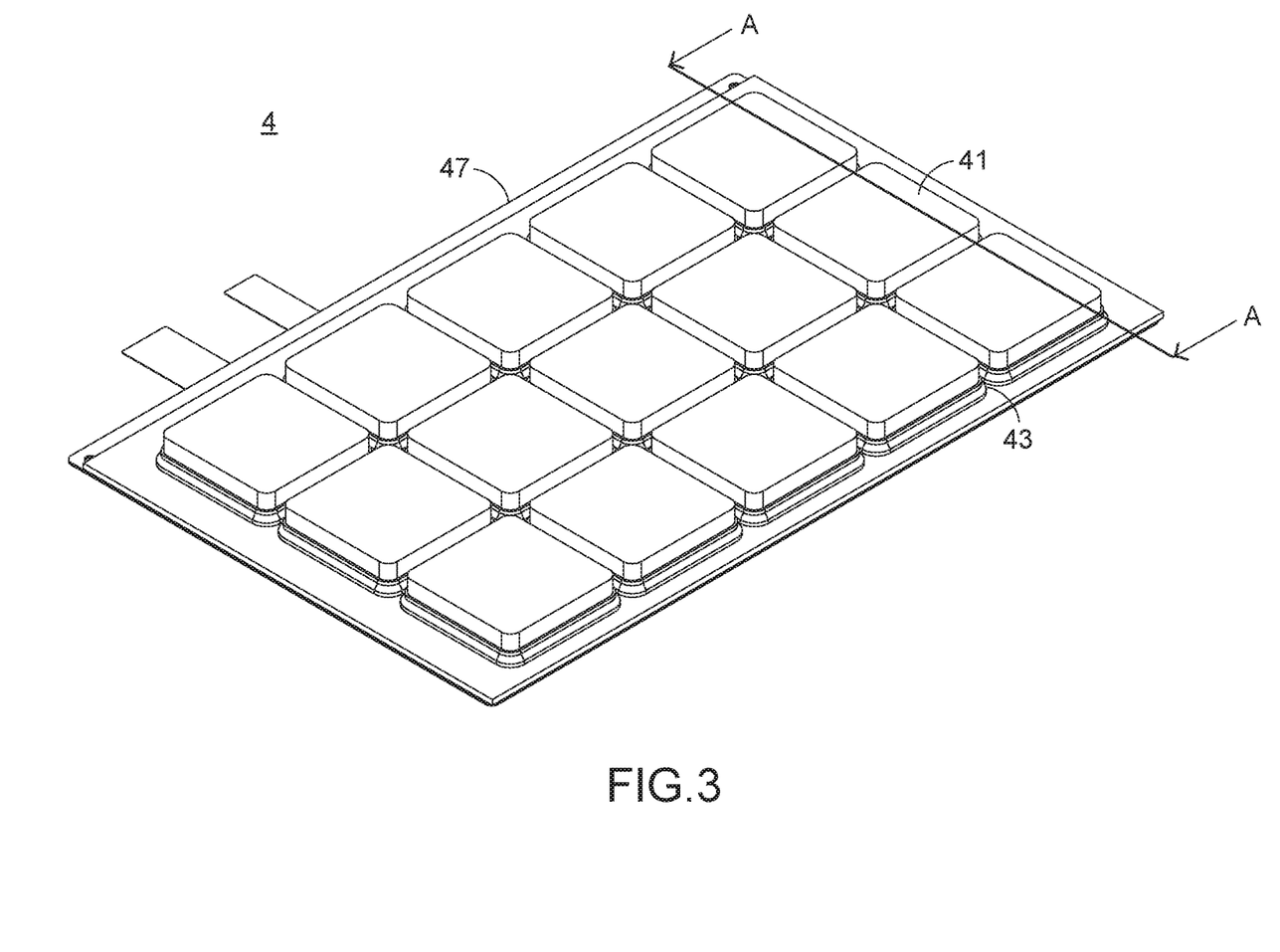
FIG. 3 is a schematic perspective view illustrating plural key structures of the control device as shown in FIG. 1.
Figure 4:
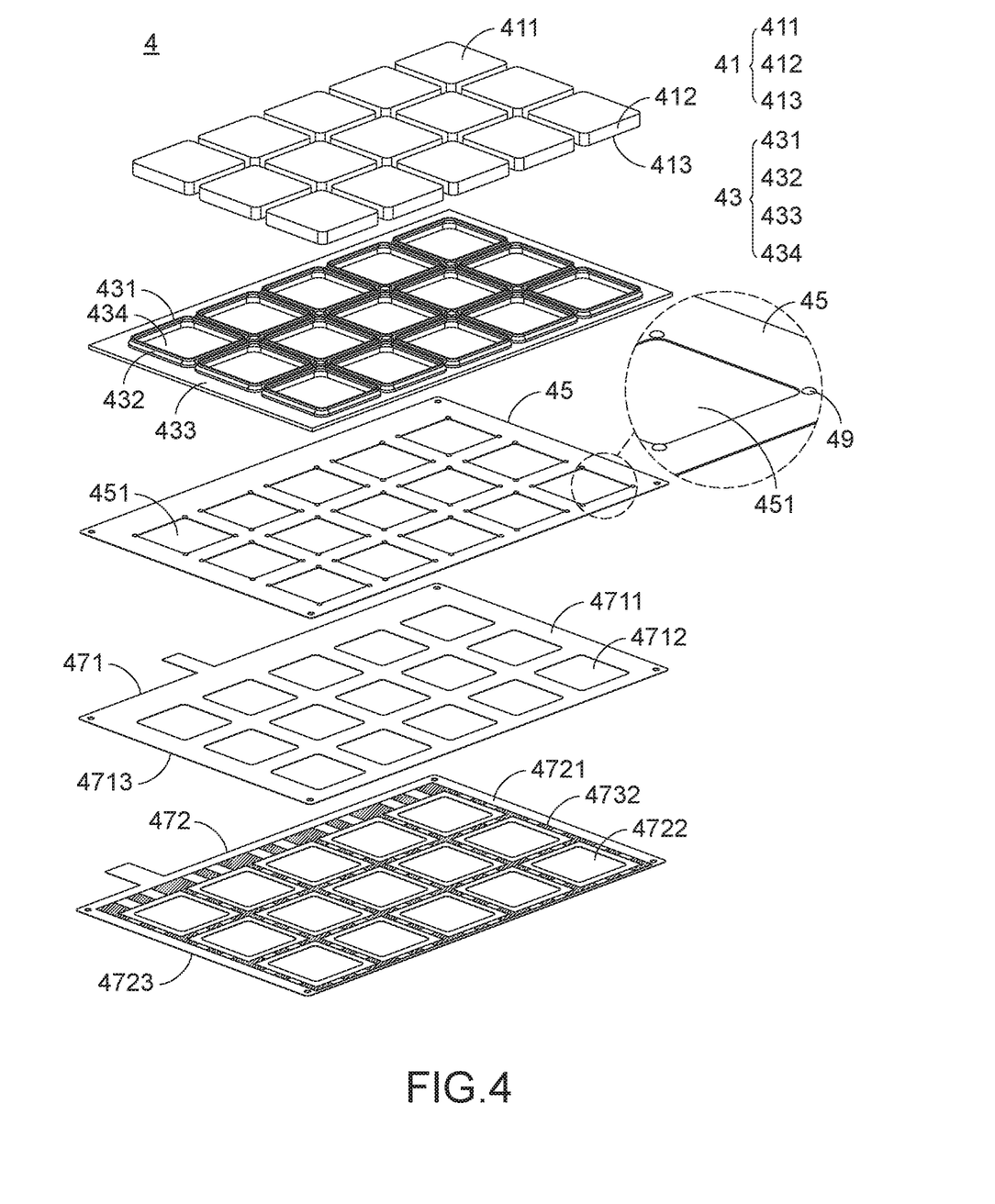
FIG. 4 is a schematic exploded view illustrating the plural key structures as shown in FIG. 3.
Figure 5:
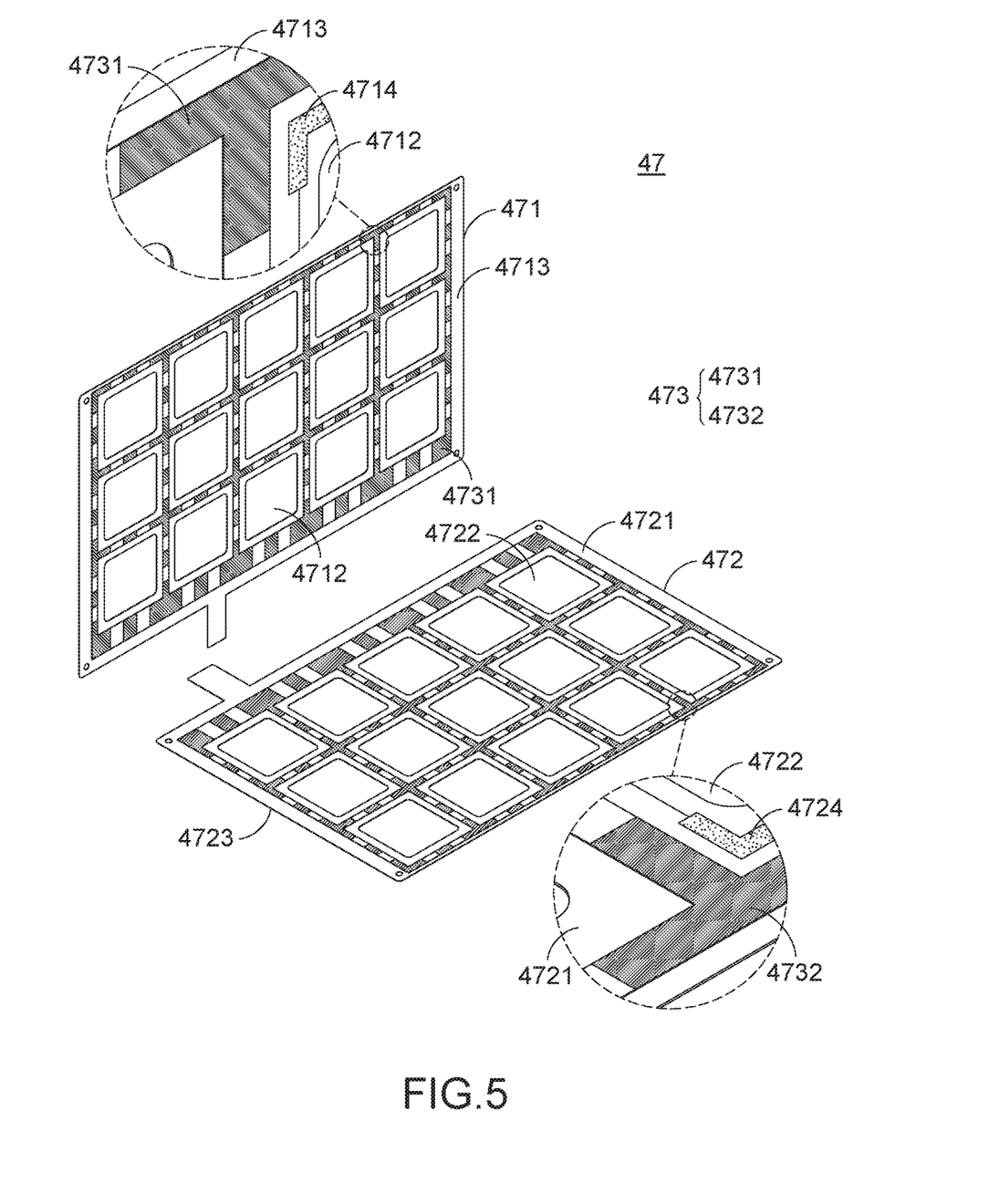
FIG. 5 is a schematic exploded view illustrating the membrane switches of the key structures as shown in FIG. 3.
Figure 6:
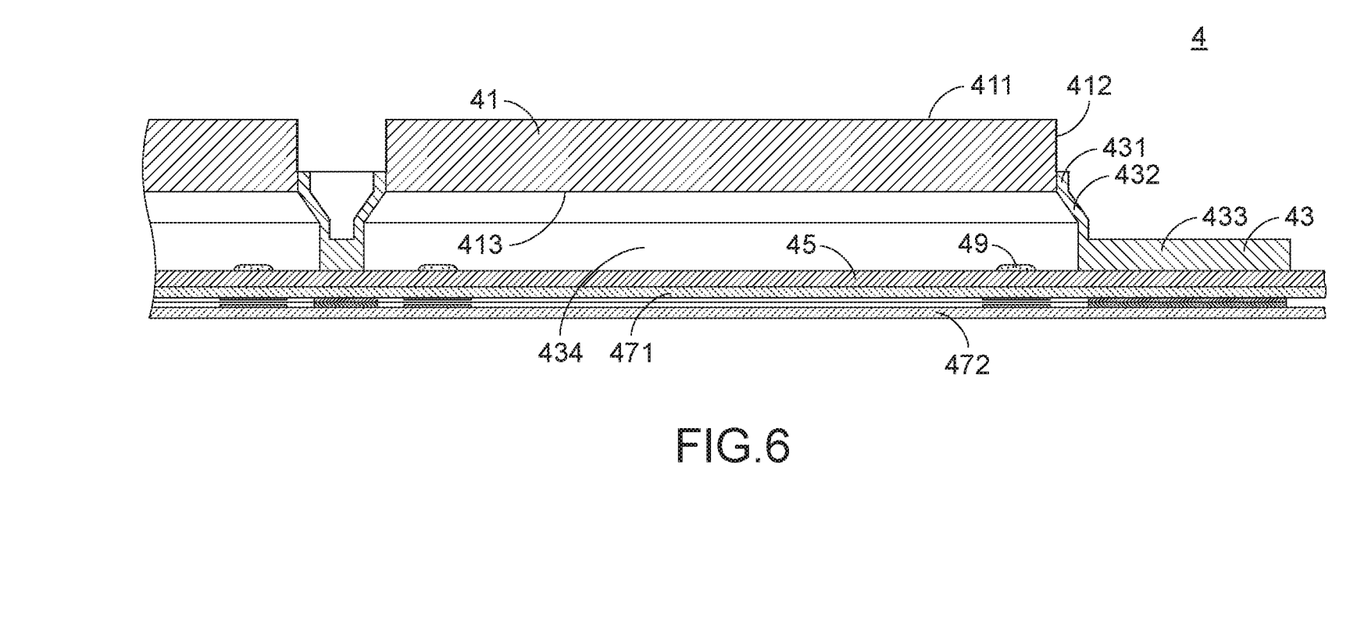
FIG. 6 is a schematic cross-sectional view illustrating a portion of the key structure as shown in FIG. 3 and taken along the line A-A.
Figure 7:
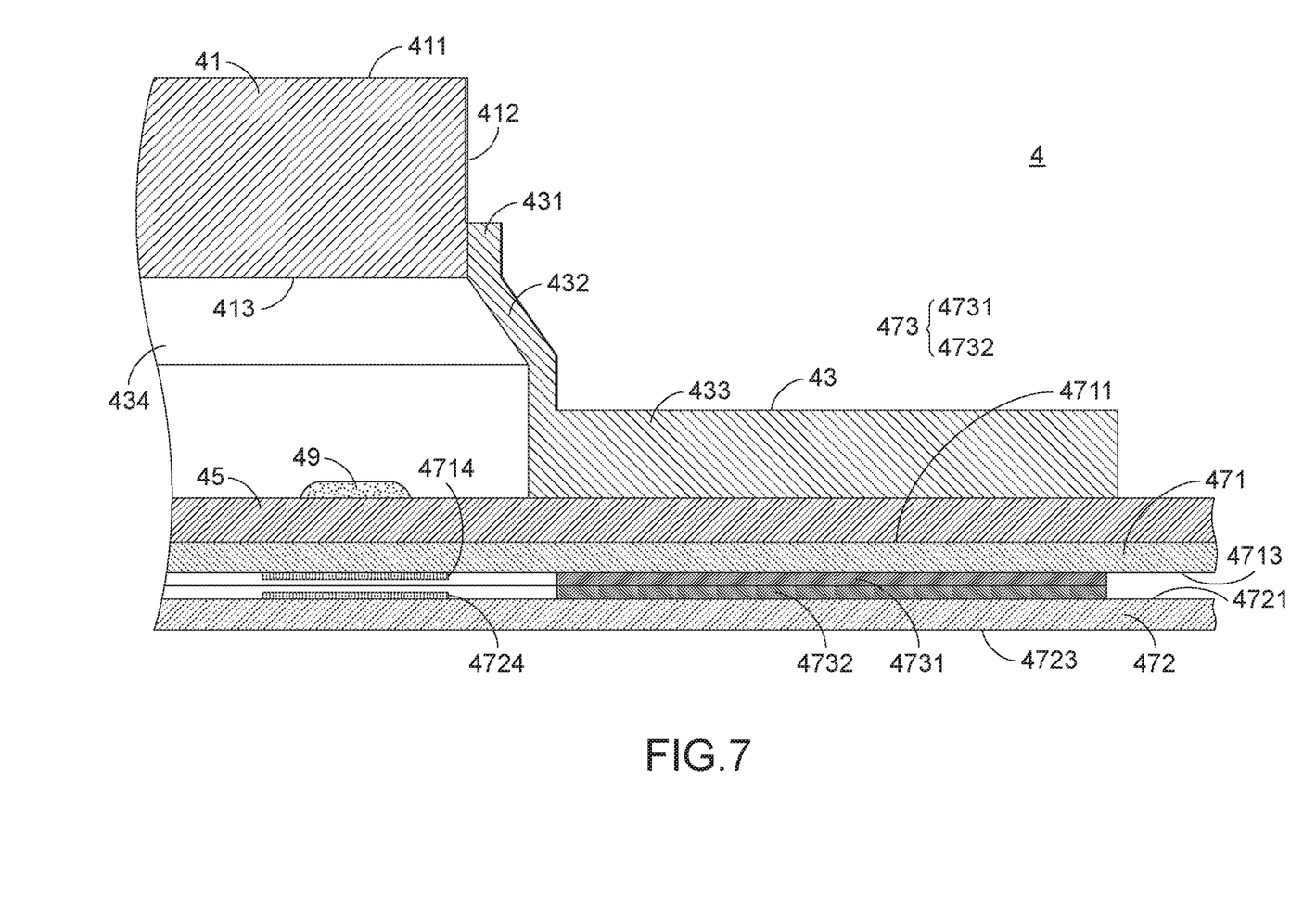
FIG. 7 is a schematic cross-sectional view illustrating an enlarged portion of the key structure as shown in FIG. 6.

FIG. 1 is a schematic perspective view illustrating the assembled structure of a control device according to a first embodiment of the present invention. FIG. 2 is a schematic exploded view illustrating the control device as shown in FIG. 1. FIG. 3 is a schematic perspective view illustrating plural key structures of the control device as shown in FIG. 1. FIG. 4 is a schematic exploded view illustrating the plural key structures as shown in FIG. 3. FIG. 5 is a schematic exploded view illustrating the membrane switches of the key structures as shown in FIG. 3. FIG. 6 is a schematic cross-sectional view illustrating a portion of the key structure as shown in FIG. 3 and taken along the line A-A. FIG. 7 is a schematic cross-sectional view illustrating an enlarged portion of the key structure as shown in FIG. 6. As shown in FIGS. 1 to 7, the control device 1 comprises a top cover 2, an outer casing 3, plural key structures 4, a display panel 5 and a main board 6.

An accommodation space 7 is defined by the top cover 2 and the outer casing 3 collaboratively. The plural key structures 4, the display panel 5 and the main board 6 are disposed within the accommodation space 7. Optionally, a processor, a signal processing device and a communication interface that support the key structures 4, the display panel 5 and the main board 6 are disposed within the control device 1.

According to the predetermined setting or control, different images, information or pictures generated by the display panel 5 can be shown on individual key regions of the key structures 4. Consequently, after a specified key structure 4 is selected and pressed down by the user, the control device 1 issues a control signal corresponding to the image, the information or the picture. Moreover, the image, the information or the picture that is defined according to the light beam from the display panel 5 can be set, controlled or changed by the user.

As shown in FIG. 2, the top cover 2 comprises plural perforations 21. The positions of the perforations 21 are aligned with the positions of the plural key structures 4. In addition, the sizes of the perforations 21 match the sizes of the corresponding key structures 4. Consequently, the key structures 4 can be exposed outside the corresponding perforations 21 in order to be pressed or operated by the user.

Please refer to FIGS. 2 to 7 again. The plural key structures 4 are located over the display panel 5. Each of the plural key structures 4 comprises a keycap 41, an elastic element 43, an optical film layer 45 and a membrane switch 47.

The keycap 41 is made of a light-transmissible material. Consequently, the keycap 41 has the light-transmissible property. The keycap 41 comprises a press surface 411, a lateral surface 412 and a bottom surface 413. The lateral surface 412 is arranged between the press surface 411 and the bottom surface 413. The image, the information or the picture generated by the display panel 5 is transmitted upwardly through the keycap 41 and thus visible by the user.

The elastic element 43 has the elastic property. After the elastic element 43 is combined with the keycap 41, the elastic element 43 provides an elastic force for moving upwardly and downwardly the keycap 41 in a reciprocating manner. In an embodiment, the elastic element 43 comprises a support part 431, a lateral wall 432, a lower part 433 and a hollow part 434. After the light beam emitted by the display panel 5 is transmitted upwardly through the hollow part 434, the light beam is transferred to the keycap 41. The support part 431 is connected with the keycap 41. In addition, the keycap 41 is supported by the support part 431. For example, the support part 431 is attached on the lateral surface 412 of the keycap 41, or the support part 431 is attached on the bottom surface 413 of the keycap 41. In the embodiment, the support part 431 of the elastic element 43 is attached on the lateral surface 412 of the keycap 41. Moreover, the support part 431 has a sleeve structure that is arranged around the keycap 41 and the hollow part 434 of the elastic element 43. As long as the shape of the support part 431 matches the shape of the keycap 41 and the support part 431 is attachable on or connectable with the keycap 41, the structure or the profile of the support part 431 is not restricted.

In an embodiment, the elastic elements 43 of the plural key structures 4 are integrated as an integral elastic film layer. The plural elastic elements 43 comprises plural support parts 431 and plural lateral walls 432 corresponding to the plural keycaps 41. Moreover, the plural support parts 431 and the plural lateral walls 432 are connected with each other through the lower parts 433 of the plural elastic elements 43. It is noted that numerous modifications may be made while retaining the teachings of the present invention. For example, in another embodiment, the plural elastic elements 43 are individual structures rather than the integral structure. That is, each elastic element 43 has the corresponding support part 431 and the corresponding lateral wall 432.

The lateral walls 432 of the elastic elements 43 are bendable or compressible. Consequently, the elastic element 43 can be subjected to deformation and returned to its original position. Moreover, the lower parts 433 of the elastic elements 43 are upwardly connected with the top cover 2 or contacted with the bottom surface of the top cover 2. The lower parts 433 of the elastic elements 43 are downwardly contacted with the optical film layer 45. In some embodiments, the key structure 4 is not equipped with the optical film layer 45. Under this circumstance, the lower parts 433 of the elastic elements 43 are directly contacted with the membrane switches 47.

The optical film layer 45 is arranged between the elastic elements 43 and the membrane switches 47. In an embodiment, the optical film layer 45 is a light-shielding sheet for sheltering a specified region or area. For example, the region between the adjacent key structures 4 is sheltered by the optical film layer 45, or other regions of the control device 1 required to be subjected to the light-shielding function or the light-leakage preventing function are shielded by the optical film layer 45. Due to the arrangement of the optical film layer 45, the area of the image, the information or the picture shown on each key structure 4 is clearer. Moreover, the optical film layer 45 comprises a perforation 451 or a light-transmissible region. The light beam emitted by the display panel 5 can be transmitted upwardly through the perforation 451 or the light-transmissible region of the optical film layer 45. Preferably but not exclusively, the optical film layer 45 has a single-layered structure or a multi-layered structure. Optionally, the key structure 4 is equipped with additional film layers to provide different effects or functions.

The membrane switch 47 comprises an upper film layer 471 and a lower film layer 472. When the membrane switch 47 is triggered, the membrane switch 47 issues a pressing signal to the main board 6.

The upper film layer 471 comprises a top surface 4711, at least one opening 4712, a bottom surface 4713 and a circuit contact point 4714. The at least one opening 4712 runs through the top surface 4711 and the bottom surface 4713. The bottom surface 4713 faces the lower film layer 472. The circuit contact point 4714 is formed on the bottom surface 4713. Moreover, the optical film layer 45 is disposed on the top surface 4711 of the upper film layer 471.

The lower film layer 472 comprises a top surface 4721, at least one opening 4722, a bottom surface 4723 and a circuit contact point 4724. The at least one opening 4722 runs through the top surface 4721 and the bottom surface 4723. The top surface 4721 faces the upper film layer 471. The circuit contact point 4724 is disposed on the top surface 4721.

The circuit contact point 4714 of the upper film layer 471 and the circuit contact point 4724 of the lower film layer 472 are overlapped with each other along the vertical direction. In case that the membrane switch 47 is not triggered or pressed, there is a gap or a distance between the circuit contact point 4714 of the upper film layer 471 and the circuit contact point 4724 of the lower film layer 472. Moreover, the light beam from the display panel 5 can be transmitted upwardly through the at least one opening 4722 of the lower film layer 472, the at least one opening 4712 of the upper film layer 471 and the keycap 41.

In the membrane switch 47, the ink member is formed on the bottom surface 4713 of the upper film layer 471 or the top surface 4721 of the lower film layer 472 by a UV printing process and then cured. Consequently, the bottom surface 4713 of the upper film layer 471 and the top surface 4721 of the lower film layer 472 are separated from each other through the ink member. Since the ink member is formed by using the UV printing process, the material of the ink member can be filled into the proper gap or region in the narrow space or layout area to be formed as the spacer. In other words, the UV printing process is suitably applied to the membrane switch with the upper film layer and the lower film layer having the openings. Moreover, the use of the UV printing process can reduce the aligning and assembling complexity of the membrane switch 47.

In an embodiment, the ink member is formed and cured on the bottom surface 4713 of the upper film layer 471 individually, or the ink member is cured and formed on the top surface 4721 of the lower film layer 472 individually. Alternatively, in another embodiment, the ink member is formed and cured on both of the bottom surface 4713 of the upper film layer 471 and the top surface 4721 of the lower film layer 472.

Please refer to FIGS. 5, 6 and 7 again. In the membrane switch 47 of this embodiment, the ink member 473 is formed and cured on both of the bottom surface 4713 of the upper film layer 471 and the top surface 4721 of the lower film layer 472. The ink member 473 comprises a first ink structure 4731 and a second ink structure 4732. The first ink structure 4731 is formed on the bottom surface 4713 of the upper film layer 471. The second ink structure 4732 is formed on the top surface 4721 of the lower film layer 472. The first ink structure 4731 and the second ink structure 4732 are contacted with each other along the vertical direction. The ink member 473 has a dot shape, a stripe shape, a cross shape, an L shape, a geometric shape, an irregular shape, a continuous shape or a discontinuous shape.

In the key structure 4, a protrusion structure is selectively formed on the optical film layer 45 or the membrane switch 47. The arrangement of the protrusion structure facilitates the user to trigger the underlying membrane switch 47 more easily and precisely when the keycap 41 is pressed down by the user. The protrusion structure is made of rubber, epoxy resin or polyester resin. Moreover, the protrusion structure is formed on the optical film layer 45 or the membrane switch 47 in an attaching process, a printing process, a coating process, a glue dispensing process or an integral formation process.

Please refer to FIGS. 4, 6 and 7 again. In the key structure 4 of this embodiment, a protrusion structure 49 is formed on the optical film layer 45. The protrusion structure 49, the keycap 41, the circuit contact point 4714 of the upper film layer 471 and the circuit contact point 4724 of the lower film layer 472 are overlapped with each other along the vertical direction. When the keycap 41 is pressed down, the bottom surface 413 of the keycap 41 is moved downwardly to push the protrusion structure 49. Consequently, the circuit contact point 4714 of the upper film layer 471 and the circuit contact point 4724 of the lower film layer 472 are contacted with each other. Under this circumstance, the key structure 4 induces, generates or outputs a pressing signal.

In an embodiment, the protrusion structure 49 is formed on the optical film layer 45 or the membrane switch 47 in the attaching process, the printing process, the coating process or the glue dispensing process. In another embodiment, the protrusion structure 49 is integrally formed with the optical film layer 45 in the integral formation process. In other words, when the optical film layer 45 is formed or produced, the protrusion structure 49 is formed simultaneously. The arrangement of the protrusion structure 49 facilitates the user to trigger the underlying membrane switch 47 more easily and precisely when the keycap 41 is pressed down by the user. Moreover, the technology of the present invention can meet the specification requirements of different products. By adjusting or controlling the height of the protrusion structure 49, the travel distance and the tactile feel of pressing down the key structure are changed. Consequently, the fabricating cost is reduced, and the time period of modifying or verifying molds is reduced.

In the control device of the first embodiment, the protrusion structure 49 is formed on the optical film layer 45. When the keycap 41 is pressed down by the user, the protrusion structure 49 facilitates the user to trigger the underlying membrane switch 47 more easily and precisely. In other embodiments, the protrusion structure is selectively formed on the membrane switch 47.

Figure 8:
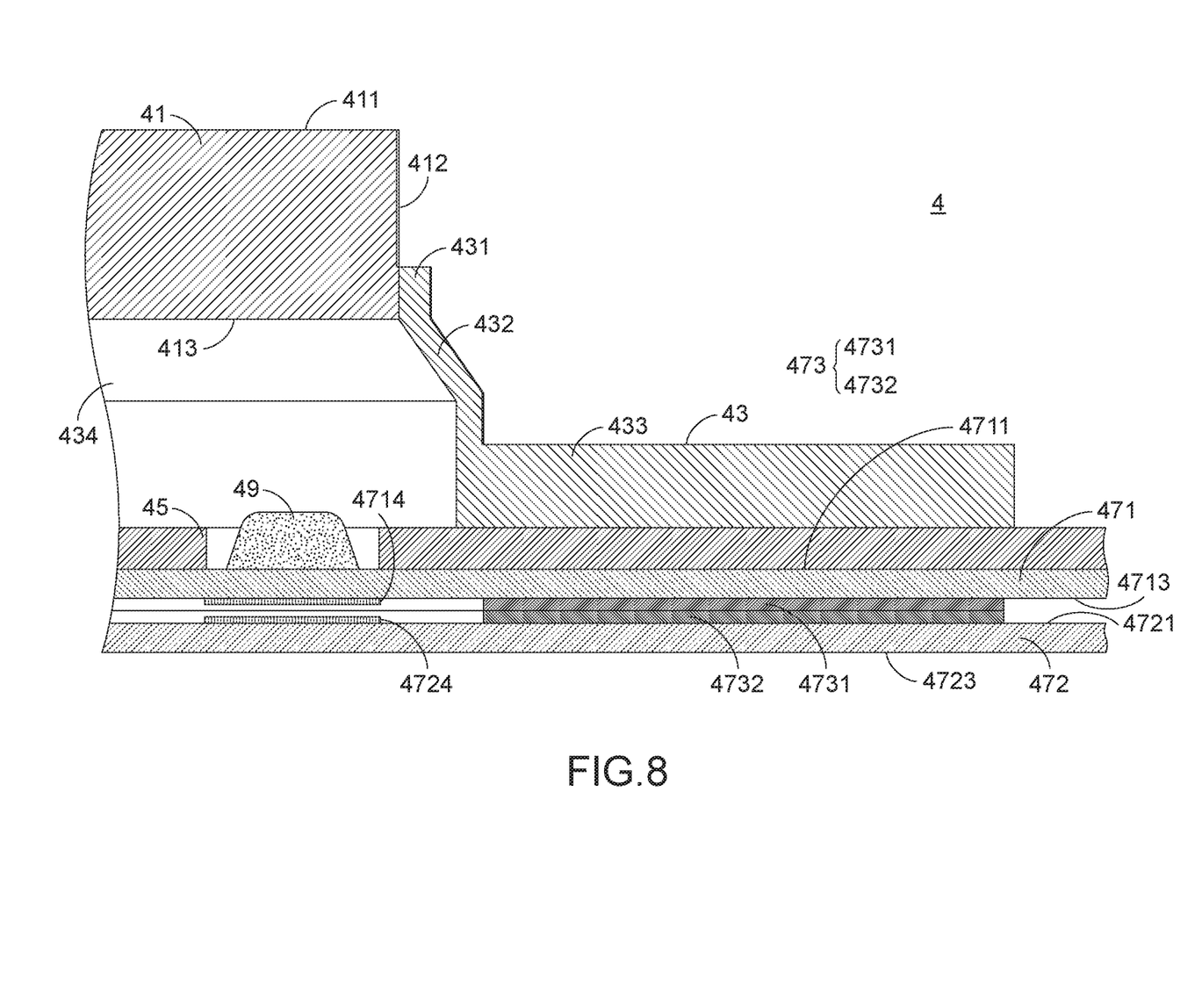
FIG. 8 is a schematic cross-sectional view illustrating an enlarged portion of a key structure of a control device according to a second embodiment of the present invention.

FIG. 8 is a schematic cross-sectional view illustrating an enlarged portion of a key structure of a control device according to a second embodiment of the present invention. In comparison with the first embodiment, the protrusion structure 49 of the key structure in the control device of this embodiment is formed on the membrane switch 47. The other components of the control device of this embodiment are similar to those of the first embodiment, and not redundantly described herein.

In the control device as shown in FIG. 8, the protrusion structure 49 is formed on the top surface 4711 of the upper film layer 471. The protrusion structure 49 is overlapped with the circuit contact point 4714 of the upper film layer 471 and the circuit contact point 4724 of the lower film layer 472 along the vertical direction. When the keycap 41 is pressed down, the bottom surface 413 of the keycap 41 is moved downwardly to push the underlying protrusion structure 49. Consequently, the circuit contact point 4714 of the upper film layer 471 is contacted with the circuit contact point 4724 of the lower film layer 472. Under this circumstance, the key structure 4 induces, generates or outputs a pressing signal.

Optionally, the control device of the second embodiment is equipped with the optical film layer 45. In an embodiment, the optical film layer 45 is arranged between the membrane switch 47 and the elastic element 43. Alternatively, the optical film layer 45 is only installed on the membrane switch 47 but not directly contacted with the elastic element 43. It is noted that the installation of the optical film layer 45 is not restricted. In case that the optical film layer 45 is arranged between the membrane switch 47 and the elastic element 43, the lower part 433 of the elastic element 43 is contacted with the optical film layer 45. In case that the optical film layer 45 is only installed on the membrane switch 47 but not directly contacted with the elastic element 43, the lower part 433 of the elastic element 43 is contacted with the membrane switch 47.

In the control devices of the first and second embodiments, the ink member 473 is formed and cured on the bottom surface 4713 of the upper film layer 471 and/or the top surface 4721 of the lower film layer 472. In addition, the ink member 473 is served as a spacer. In some other embodiments, the control device is further equipped with a spacer. The upper film layer 471 and the lower film layer 472 are separated from each other through the spacer.

Figure 9:
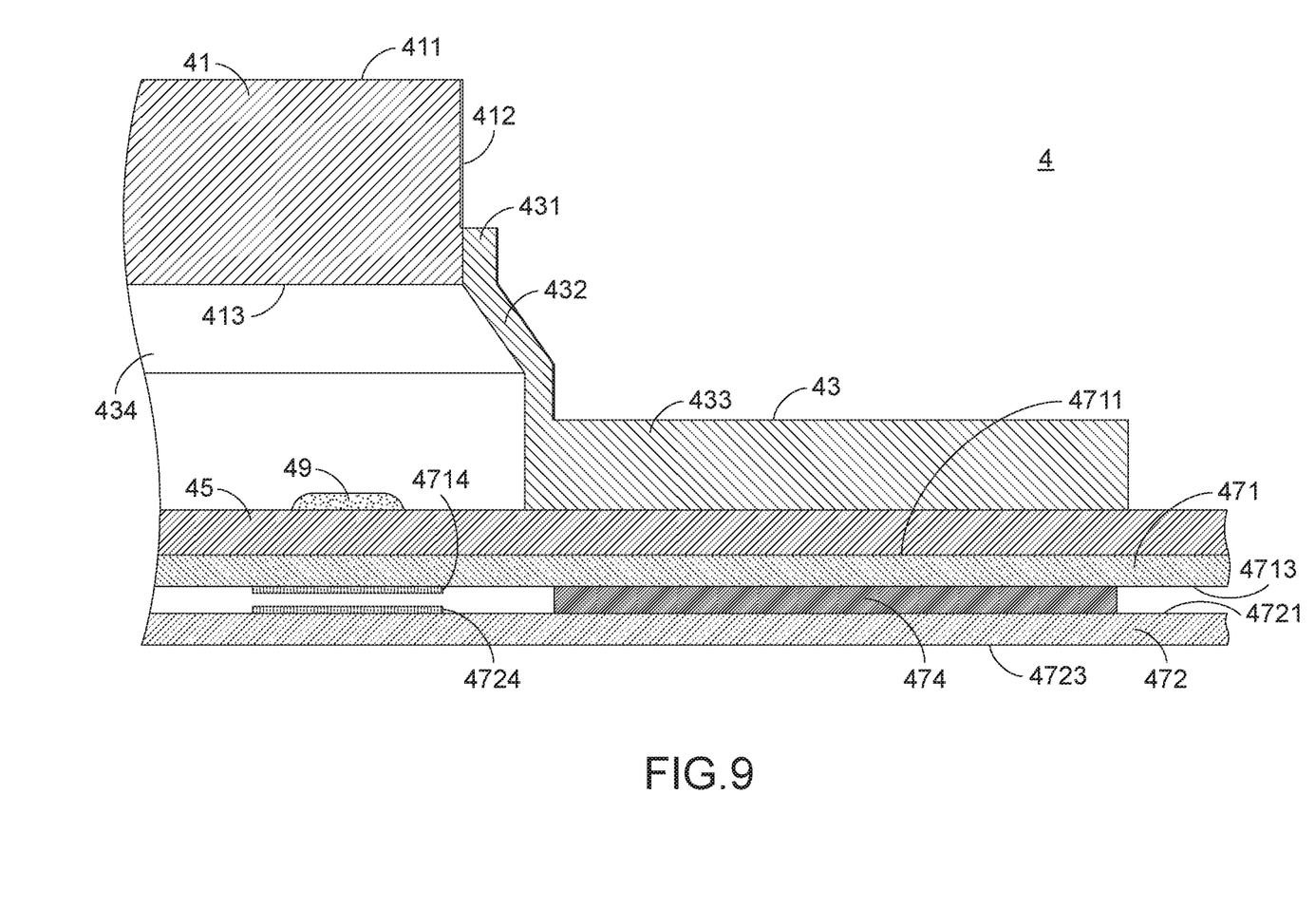
FIG. 9 is a schematic cross-sectional view illustrating an enlarged portion of a key structure of a control device according to a third embodiment of the present invention.

FIG. 9 is a schematic cross-sectional view illustrating an enlarged portion of a key structure of a control device according to a third embodiment of the present invention. In this embodiment, the control device is equipped with a spacer 474 between the upper film layer 471 and the lower film layer 472. The upper film layer 471 and the lower film layer 472 are separated from each other through the spacer 474. In comparison with the first and second embodiments, the control device of this embodiment further comprises the spacer 474 between the upper film layer 471 and the lower film layer 472. That is, no ink member is formed on the upper film layer 471 or the lower film layer 472. The other components of the control device of this embodiment are similar to those of the first and second embodiments, and not redundantly described herein.

In the control devices of the first, second and third embodiments, the keycap 41 and the protrusion structure 49, the circuit contact point 4714 of the upper film layer 471 and the circuit contact point 4724 of the lower film layer 472 under the keycap 41 are overlapped with each other along the vertical direction. In some other embodiments, the keycap 41 and the protrusion structure 49, the circuit contact point 4714 of the upper film layer 471 and the circuit contact point 4724 of the lower film layer 472 under the keycap 41 are not overlapped with each other along the vertical direction. Instead, the support part 431 of the elastic element 43 is overlapped with the underlying circuit contact point 4714 of the upper film layer 471 and the underlying circuit contact point 4724 of the lower film layer 472 along the vertical direction.

Figure 10:
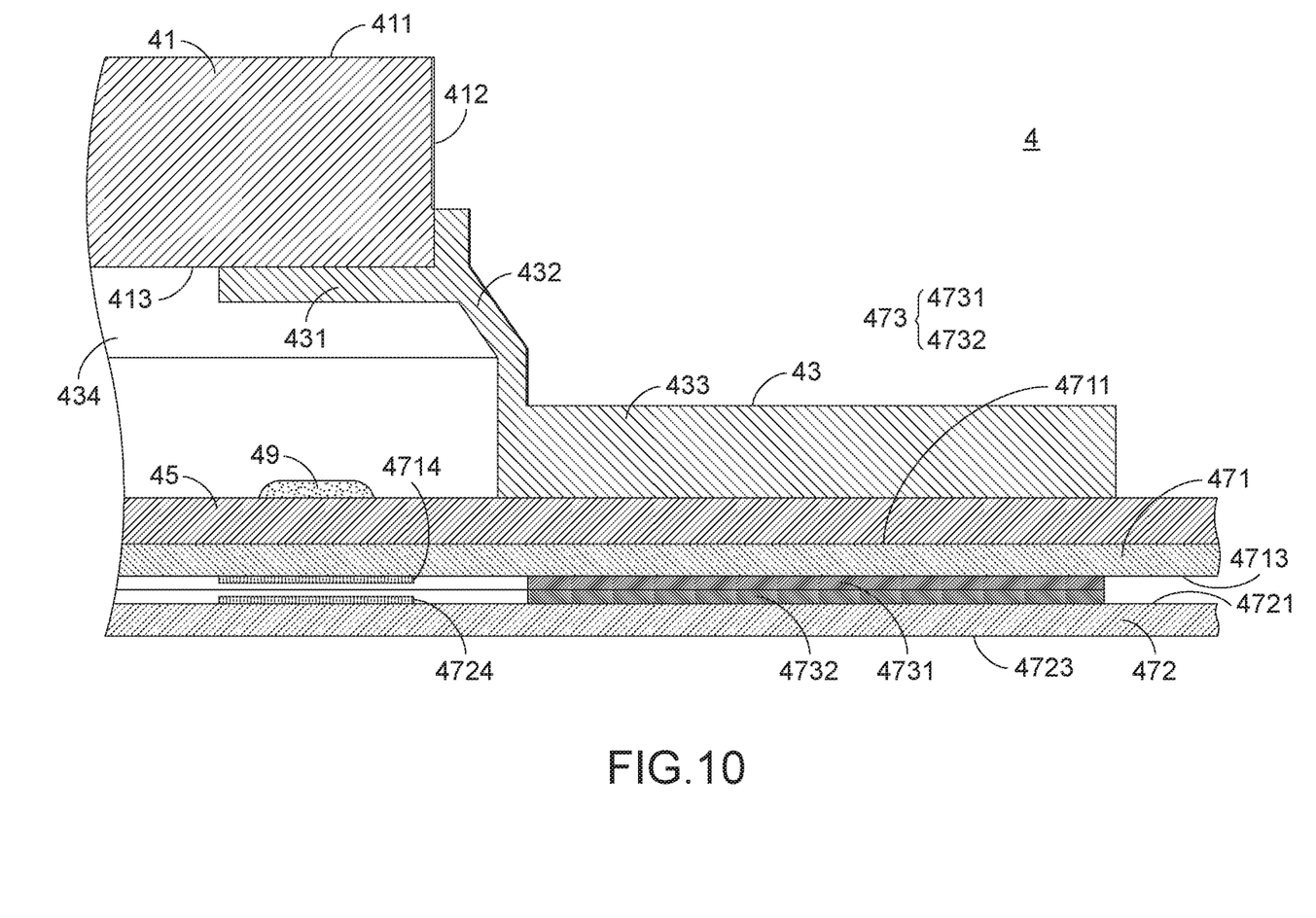
FIG. 10 is a schematic cross-sectional view illustrating an enlarged portion of a key structure of a control device according to a fourth embodiment of the present invention.

FIG. 10 is a schematic cross-sectional view illustrating an enlarged portion of a key structure of a control device according to a fourth embodiment of the present invention. In comparison with the first, second and third embodiments, the design of the support part 431 of the elastic element 43 is distinguished. The other components of the control device of this embodiment are similar to those of the first, second and third embodiments, and not redundantly described herein.

In the fourth embodiment as shown in FIG. 10, the support part 431 of the elastic element 43 is extended inwardly in the direction toward the hollow part 434 of the elastic element 43. Consequently, the bottom surface 413 of the keycap 41 is contacted with or supported by the support part 431 of the elastic element 43. Under this circumstance, the protrusion structure 49 is overlapped with the support part 431 of the elastic element 43, the circuit contact point 4714 of the upper film layer 471 and the circuit contact point 4724 of the lower film layer 472 along the vertical direction. When the keycap 41 is pressed down, the support part 431 of the elastic element 43 is moved downwardly to push the underlying protrusion structure 49. Consequently, the circuit contact point 4714 of the upper film layer 471 is contacted with the circuit contact point 4724 of the lower film layer 472. Under this circumstance, the key structure 4 induces, generates or outputs a pressing signal.

In the fourth embodiment, the support part 431 of the elastic element 43 is moved downwardly to push the protrusion structure 49 when the keycap 41 is pressed down, and thus the circuit contact point 4714 of the upper film layer 471 is contacted with the circuit contact point 4724 of the lower film layer 472. In some other embodiments, each of the keycap 41 and the support part 431 of the elastic element 43 is equipped with an auxiliary structure. Due to the auxiliary structure, the tactile feel and the precision of pressing down the key structure will be enhanced.

Figure 11:
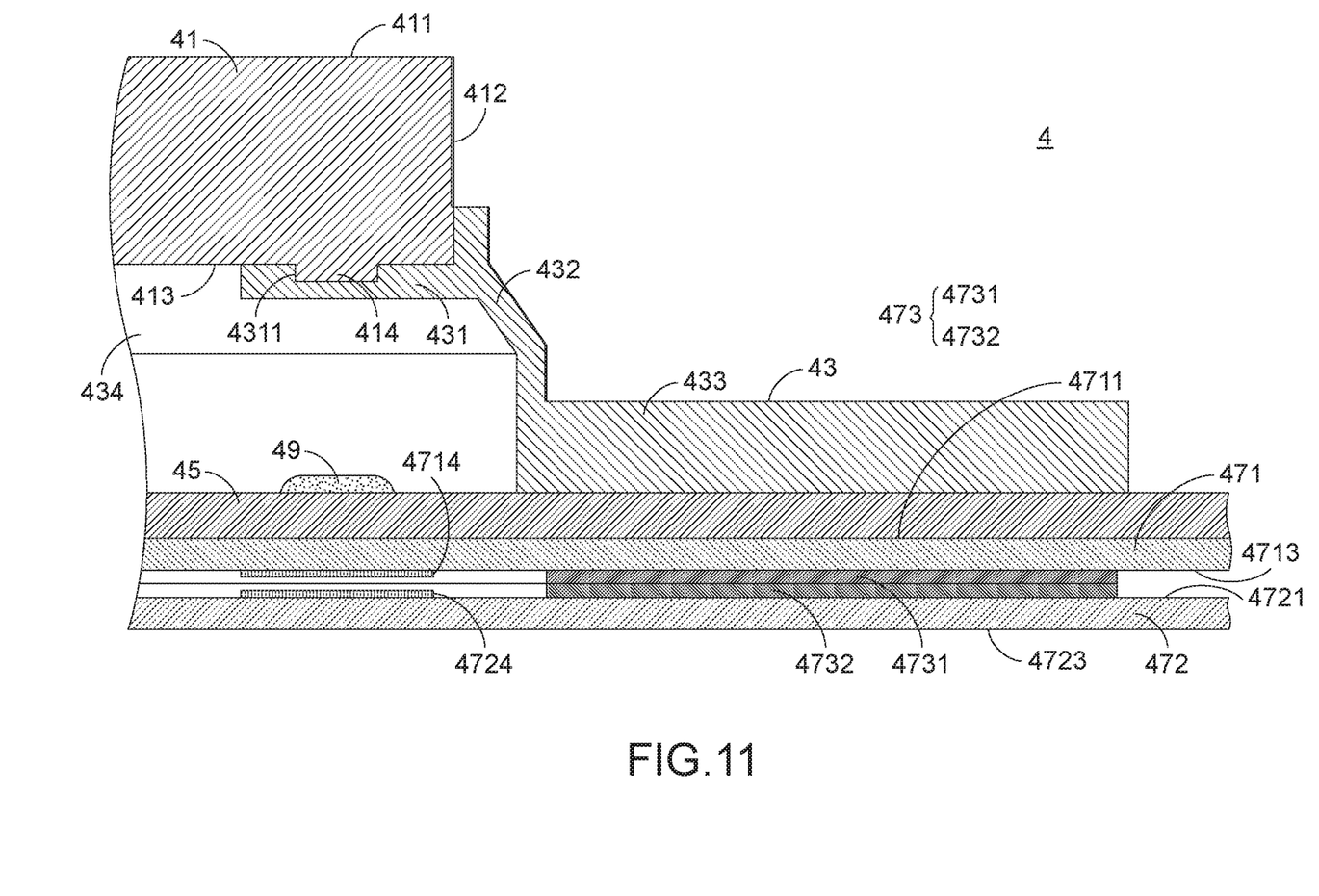
FIG. 11 is a schematic cross-sectional view illustrating an enlarged portion of a key structure of a control device according to a fifth embodiment of the present invention.

FIG. 11 is a schematic cross-sectional view illustrating an enlarged portion of a key structure of a control device according to a fifth embodiment of the present invention. In comparison with the fourth embodiment, the designs of the keycap 41 and the support part 431 of the elastic element 43 are distinguished. The other components of the control device of this embodiment are similar to those of the fourth embodiment, and not redundantly described herein.

In the control device as shown in FIG. 11, the keycap 41 comprises a protrusion structure 414. The protrusion structure 414 is protruded downwardly from the bottom surface 413 of the keycap 41. Correspondingly, a recess 4311 is formed in the support part 431 of the elastic element 43. The recess 4311 faces the protrusion structure 414. When the bottom surface 413 of the keycap 41 is contacted with the support part 431 of the elastic element 43, the protrusion structure 414 of the keycap 41 is received within the recess 4311. The protrusion structure 414 is overlapped with the recess 4311 of the support part 431, the protrusion structure 49, the circuit contact point 4714 of the upper film layer 471 and the circuit contact point 4724 of the lower film layer 472 along the vertical direction. When the keycap 41 is pressed down, the protrusion structure 414 is moved downwardly to push the support part 431 of the elastic element 43. After the support part 431 is moved downwardly for a specified travel distance, the support part 431 is continuously moved to push the underlying protrusion structure 49. Consequently, the circuit contact point 4714 of the upper film layer 471 is contacted with the circuit contact point 4724 of the lower film layer 472. Under this circumstance, the key structure 4 induces, generates or outputs a pressing signal.

In the control device of the present invention, each key structure 4 is at least equipped or collocated with a protrusion structure 49. In the first, second, third, fourth and fifth embodiments, each key structure 4 is aligned with four protrusion structures 49. The four protrusion structures 49 are respectively located at four corners of the key structure 4. Consequently, even if the pressing force is not applied to the center of the keycap 41, the keycap 41 is not pressed down in an askew or inclined manner. That is, the circuit contact point 4714 of the upper film layer 471 still can be contacted with the circuit contact point 4724 of the lower film layer 472 successfully.

In this context, the term "contact" includes the direct contact and the indirect contact. In case that two objects are directly contacted or connected with each other, the two objects are in direct contact with each other. In case that two objects are not directly contacted or connected but the two objects are indirectly connected with each other through an intermediate medium, the two objects are in indirect contact with each other.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A control device, comprising:
   a display panel; and
   at least one key structure located over the display panel, wherein each of the at least one key structure comprises:
   a keycap, wherein the keycap is light-transmissible;
   an optical film layer;
   an elastic element arranged between the keycap and the optical film layer, wherein the elastic element comprises a support part, a lateral wall and a lower part, wherein the support part is connected with the keycap, and the lateral wall is arranged between the support part and the lower part;
   a first protrusion structure formed on the optical film layer; and
   a membrane switch located under the optical film layer, wherein when the keycap is pressed down, the keycap or the support part is moved downwardly to push the first protrusion structure, so that the membrane switch is triggered, wherein the membrane switch comprises an upper film layer and a lower film layer, wherein the upper film layer comprises a first top surface, at least one first opening, a first bottom surface and a first circuit contact point, and the lower film layer comprises a second top surface, at least one second opening, a second bottom surface and a second circuit contact point, wherein the at least one first opening runs through the first top surface and the first bottom surface, the first bottom surface faces the lower film layer, the first circuit contact point is formed on the first bottom surface, the at least one second opening runs through the second top surface and the second bottom surface, the second top surface faces the upper film layer, the second circuit contact point is formed on the second top surface, and the first circuit contact point and the second circuit contact point are overlapped with each other along a vertical direction, wherein a light beam emitted by the display panel is transmitted upwardly through the at least one second opening, the at least one first opening and the keycap.

2. The control device according to claim 1, wherein the at least one ink member comprises a first ink structure and a second ink structure, wherein the first ink structure is formed on the first bottom surface, the second ink structure is formed on the second top surface, and the first ink structure and the second ink structure are contacted with each other along the vertical direction.

3. The control device according to claim 1, wherein the membrane switch further comprises a spacer, and the spacer is arranged between the upper film layer and the lower film layer, wherein the upper film layer and the lower film layer are separated from each other through the spacer.

4. The control device according to claim 1, wherein the first protrusion structure is overlapped with the first circuit contact point and the second circuit contact point along the vertical direction.

5. The control device according to claim 1, wherein when the keycap is pressed down, the keycap or the support part is moved downwardly to push the first protrusion structure, so that the first circuit contact point and the second circuit contact point are contacted with each other.

6. The control device according to claim 1, wherein the optical film layer is a light-shielding sheet.

7. The control device according to claim 1, wherein the first protrusion structure is made of rubber, epoxy resin or polyester resin, and the first protrusion structure is formed by using an attaching process, a printing process, a coating process, a glue dispensing process or an integral formation process.

8. The control device according to claim 1, wherein the keycap comprises a press surface, a lateral surface and a bottom surface, and the support part of the elastic element is connected with the lateral surface of the keycap, wherein when the keycap is pressed down, the bottom surface of the keycap is moved downwardly to push the first protrusion structure.

9. The control device according to claim 1, wherein the keycap comprises a press surface, a lateral surface and a bottom surface, and the bottom surface of the keycap is contacted with the support part of the elastic element, wherein when the keycap is pressed down, the support part of the elastic element is moved downwardly to push the first protrusion structure.

10. The control device according to claim 1, wherein the keycap comprises a press surface, a lateral surface, a third bottom surface and a second protrusion structure, wherein the second protrusion structure is protruded downwardly from the third bottom surface, and the second protrusion structure is overlapped with the first protrusion structure, the first circuit contact point and the second circuit contact point along the vertical direction, wherein the support part of the elastic element comprises a recess, and the second protrusion structure is received within the recess.

11. The control device according to claim 1, wherein the membrane switch further comprises at least one ink member, and at least one ink member is formed on the first bottom surface or the second top surface, wherein the upper film layer and the lower film layer are separated from each other through the at least one ink member.

12. The control device according to claim 11, wherein the at least one ink member is formed on the first bottom surface or the second top surface by using a UV printing process.

13. A control device, comprising:
    a display panel; and
    at least one key structure located over the display panel, wherein each of the at least one key structure comprises:
    a keycap, wherein the keycap is light-transmissible;
    a membrane switch;
    an elastic element arranged between the keycap and the membrane switch, wherein the elastic element comprises a support part, a lateral wall and a lower part, wherein the support part is connected with the keycap, and the lateral wall is arranged between the support part and the lower part; and a first protrusion structure formed on the membrane switch, wherein when the keycap is pressed down, the keycap or the support part is moved downwardly to push the first protrusion structure, so that the membrane switch is triggered;

wherein the membrane switch comprises an upper film layer and a lower film layer, wherein the upper film layer comprises a first top surface, at least one first opening, a first bottom surface and a first circuit contact point, and the lower film layer comprises a second top surface, at least one second opening, a second bottom surface and second circuit contact point, wherein the at least one first opening runs through the first top surface and the first bottom surface, the first bottom surface faces the lower film layer, the first circuit contact point is formed on the first bottom surface, the at least one second opening runs through the second top surface and the second bottom surface, the second top surface faces the upper film layer, the second circuit contact point is formed on the second top surface, and the first circuit contact point and the second circuit contact point are overlapped with each other along a vertical direction, wherein a light beam emitted by the display panel is transmitted upwardly through the at least one second opening, the at least one first opening and the keycap.

14. The control device according to claim 13, wherein the membrane switch further comprises a spacer, and the spacer is arranged between the upper film layer and the lower film layer, wherein the upper film layer and the lower film layer are separated from each other through the spacer.

15. The control device according to claim 13, wherein the first protrusion structure is overlapped with the first circuit contact point and the second circuit contact point along the vertical direction.

16. The control device according to claim 13, wherein when the keycap is pressed down, the keycap or the support part is moved downwardly to push the first protrusion structure, so that the first circuit contact point and the second circuit contact point are contacted with each other.

17. The control device according to claim 13, wherein the first protrusion structure is made of rubber, epoxy resin or polyester resin, and the first protrusion structure is formed by using an attaching process, a printing process, a coating process, a glue dispensing process or an integral formation process.

18. The control device according to claim 13, wherein the keycap comprises a press surface, a lateral surface and a bottom surface, and the support part of the elastic element is connected with the lateral surface of the keycap, wherein when the keycap is pressed down, the bottom surface of the keycap is moved downwardly to push the first protrusion structure.

19. The control device according to claim 13, wherein the keycap comprises a press surface, a lateral surface and a bottom surface, and the bottom surface of the keycap is contacted with the support part of the elastic element, wherein when the keycap is pressed down, the support part of the elastic element is moved downwardly to push the first protrusion structure.

20. The control device according to claim 13, wherein the keycap comprises a press surface, a lateral surface, a third bottom surface and a second protrusion structure, wherein the second protrusion structure is protruded downwardly from the third bottom surface, and the second protrusion structure is overlapped with the first protrusion structure, the first circuit contact point and the second circuit contact point along the vertical direction, wherein the support part of the elastic element comprises a recess, and the second protrusion structure is received within the recess.

21. The control device according to claim 13, wherein the membrane switch further comprises at least one ink member, and at least one ink member is formed on the first bottom surface or the second top surface, wherein the upper film layer and the lower film layer are separated from each other through the at least one ink member.

22. The control device according to claim 21, wherein the at least one ink member is formed on the first bottom surface or the second top surface by using a UV printing process.

23. The control device according to claim 21, wherein the at least one ink member comprises a first ink structure and a second ink structure, wherein the first ink structure is formed on the first bottom surface, the second ink structure is formed on the second top surface, and the first ink structure and the second ink structure are contacted with each other along the vertical direction.

* * * * *